(12) United States Patent
Kinoshita

(10) Patent No.: US 10,367,390 B2
(45) Date of Patent: Jul. 30, 2019

(54) INSULATOR FOR INSULATING COILS OF A STATOR OF ELECTRIC MOTOR

(71) Applicant: FANUC CORPORATION, Yamanashi (JP)

(72) Inventor: Shinichi Kinoshita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 64 days.

(21) Appl. No.: 15/420,169

(22) Filed: Jan. 31, 2017

(65) Prior Publication Data

US 2017/0237309 A1 Aug. 17, 2017

(30) Foreign Application Priority Data

Feb. 17, 2016 (JP) ................. 2016-028018

(51) Int. Cl.
*H02K 3/34* (2006.01)
*H02K 1/14* (2006.01)
*H02K 3/18* (2006.01)
*H02K 3/38* (2006.01)

(52) U.S. Cl.
CPC ............ *H02K 3/345* (2013.01); *H02K 1/146* (2013.01); *H02K 3/18* (2013.01); *H02K 3/38* (2013.01)

(58) Field of Classification Search
CPC ............ H02K 3/345; H02K 3/18; H02K 3/38; H02K 3/32; H02K 3/30; H02K 3/487; H02K 1/146
USPC ........................ 310/214, 215, 68 R
See application file for complete search history.

(56) References Cited

U.S. PATENT DOCUMENTS

| | | |
|---|---|---|
| 6,509,665 B1 | 1/2003 | Nishiyama et al. |
| 2004/0183391 A1 | 9/2004 | Kimura et al. |
| 2015/0028712 A1 | 1/2015 | Horiba et al. |

FOREIGN PATENT DOCUMENTS

| | | | | |
|---|---|---|---|---|
| JP | 5122910 A | | 5/1993 | |
| JP | 555748 U | | 7/1993 | |
| JP | 956101 A | | 2/1997 | |
| JP | 09056101 A | * | 2/1997 | ............ H02K 3/34 |
| JP | 200472899 A | | 3/2004 | |
| JP | 2004-289930 A | | 10/2004 | |
| JP | 2006-109615 A | | 4/2006 | |
| JP | 2008125143 A | | 5/2008 | |

(Continued)

OTHER PUBLICATIONS

Machine translation of JP 09056101 A (Feb. 1997).*

(Continued)

*Primary Examiner* — Michael Andrews
(74) *Attorney, Agent, or Firm* — Fredrikson & Byron, P.A.

(57) ABSTRACT

A stator capable of preventing the displacement of insulators and securely positioning the insulators at given positions. A stator includes a stator core formed with slots; a coil wound around the stator core, the coil comprising a coil side and a coil end, the coil end arranged outside the slot; and insulators provided in the slots. Each insulator includes a coil side-insulation part arranged between wall surfaces of a slot and a first coil side and electrically insulating the wall surfaces from the first coil side; and a coil end-insulation part formed in one piece with the coil side-insulation part and arranged outside the first slot. The coil end-insulation part is arranged between a first coil end and a second coil end and electrically insulates the first coil end from the second coil end.

7 Claims, 6 Drawing Sheets

(56) References Cited

FOREIGN PATENT DOCUMENTS

| JP | 2009171720 A | 7/2009 |
|---|---|---|
| JP | 2010154693 A | 7/2010 |
| JP | 201234453 A | 2/2012 |
| JP | 2012157225 A | 8/2012 |
| JP | 2015-023754 A | 2/2015 |

OTHER PUBLICATIONS

English Abstract and Machine Translation for Japanese Publication No. 2012-157225 A, published Aug. 16, 2012, 10 pgs.

English Abstract and Machine Translation for Japanese Publication No. 2010-154693 A, published Jul. 8, 2010, 19 pgs.

English Abstract and Machine Translation for Japanese Publication No. 2008-125143 A, published May 29, 2008, 12 pgs.

English Abstract and Machine Translation for Japanese Publication No. 09-056101 A, published Feb. 25, 1997, 11 pgs.

English Abstract and Machine Translation for Japanese Publication No. 2012-034453 A, published Feb. 16, 2012, 24 pgs.

English Abstract and Machine Translation for Japanese Publication No. 2004-072899 A, published Mar. 4, 2004, 14 pgs.

English Abstract and Machine Translation for Japanese Publication No. JPH 05-055748 U, published Jul. 23, 1993, 7 pgs.

English Abstract and Machine Translation for Japanese Publication No. JPH 05-122910 A, published May 18, 1993, 9 pgs.

English Abstract and Machine Translation for Japanese Publication No. 2004-289930 A, published Oct. 14, 2004, 22 pages.

English Abstract and Machine Translation for Japanese Publication No. 2015-023754 A, published Feb. 2, 2015, 15 pages.

English Abstract and Machine Translation for Japanese Publication No. 2006-109615 A, published Apr. 20, 2006, 13 pages.

English Abstract and Machine Translation for Japanese Publication No. 2009-171720 A, published Jul. 30, 2009, 13 pgs.

\* cited by examiner

INSULATOR FOR INSULATING COILS OF A STATOR OF ELECTRIC MOTOR

BACKGROUND OF THE INVENTION

1. Field of the Invention

The invention relates to stators of electric motors.

2. Description of the Related Art

Stator cores have coils that are wound around them and received in slots defined in the stator cores. Conventionally, insulators are used for insulating coils from slot wall surfaces or for insulating coils connected to different lines (e.g., U, V, and W lines) from each other (see e.g., Japanese Unexamined Patent Publication (Kokai) No. 2004-072899 and Japanese Unexamined Patent Publication (Kokai) No. 2012-034453).

There has been a demand of techniques for preventing insulators of such motors as described above from being displaced and for securely positioning the insulators at given positions.

SUMMARY OF THE INVENTION

A stator of an electric motor comprises a stator core formed with a plurality of slots; a coil wound around the stator core, and including a coil side received in one of the slots and a coil end arranged outside of the slot; and a plurality of insulators, each of which is arranged in each of the plurality of slots.

Each insulator includes a coil side-insulation part arranged between a wall surface(s) of a first slot of the plurality of slots, in which the insulator is arranged, and a first coil side received in the first slot, the coil side-insulation part electrically insulating the first coil side from the wall surface(s); and a coil end-insulation part integrally coupled with the coil side-insulation part, and arranged outside of the first slot.

The coil end-insulation part is arranged between a first coil end of a first coil including the first coil side and a second coil end of a second coil including a second coil side received in a second slot of the plurality of slots different from the first slot, the coil end-insulation part electrically insulating the first coil end from the second coil end.

Each insulator may be a seamless one-piece member. The coil end-insulation parts of two adjacent insulators may be arranged so as to overlap each other. The stator may further comprise a connection part configured to connect the coil end-insulation parts of two adjacent insulators. In another aspect of the invention a motor comprises the above-described stator.

BRIEF DESCRIPTION OF THE DRAWINGS

Above-described or other objects, features, and advantages of the invention will be clarified by descriptions of the following embodiments with reference to accompanying drawings, in which.

DETAILED DESCRIPTION

Figure 1:
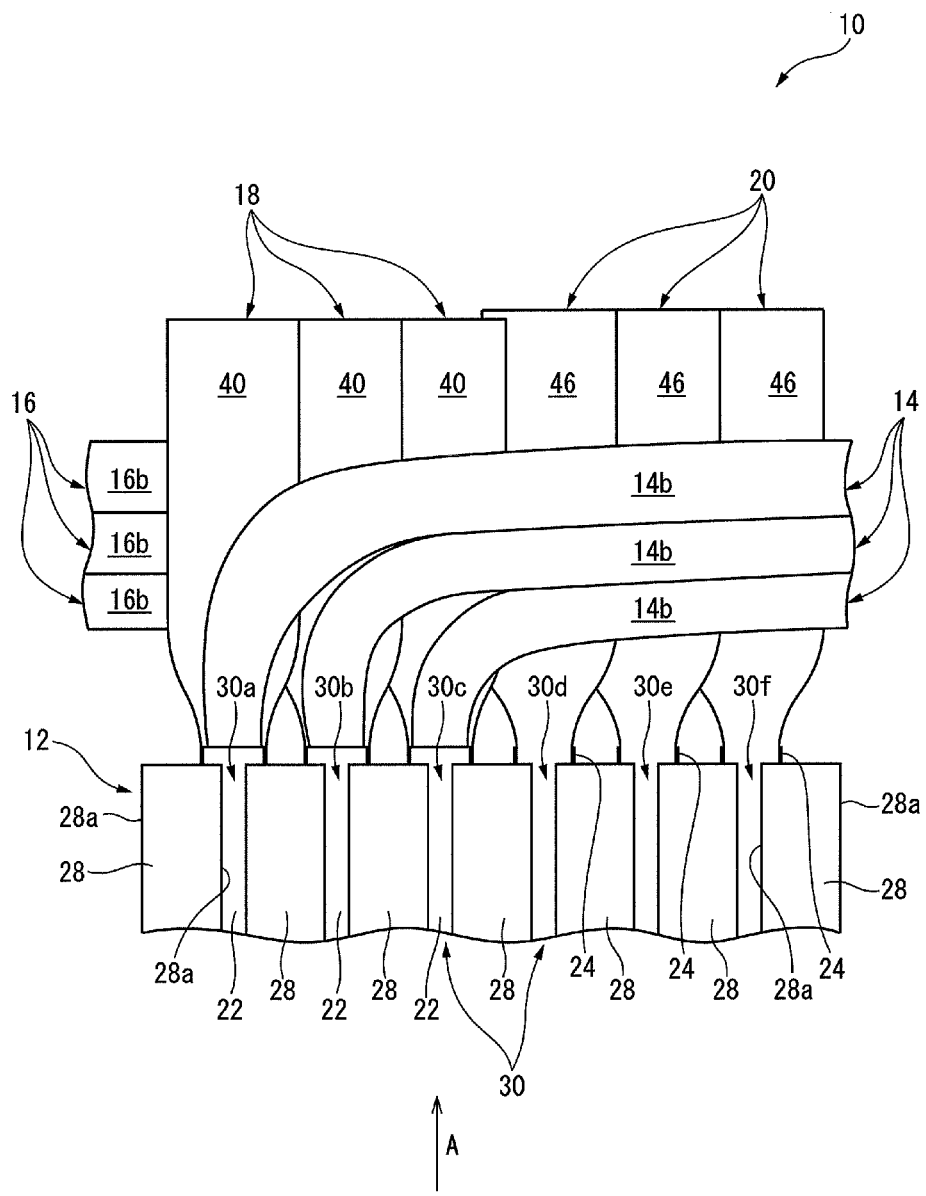
FIG. 1 is a view of a stator according to an embodiment, as seen from radially inside thereof.

Embodiments of the invention will be described below in detail with reference to the drawings. Note that, in the following embodiments, similar elements are assigned the same reference numerals, and detailed descriptions thereof will be omitted.

First, referring to FIGS. 1-4, a stator 10 according to an embodiment will be described. The stator 10 is cylindrical, and constitutes a motor together with a rotor (not shown) which is rotatably supported radially inside of the stator 10.

In the description of this embodiment, the axial direction corresponds to a direction along the central axis of the stator 10 (i.e., along the arrow A in the drawings), the radial direction corresponds to a radial direction of a circle centered about the central axis of the stator 10, and the circumferential direction corresponds to a circumferential direction of the circle. For convenience, the direction indicated by the arrow A is referred to as the upward in the axial direction (or axially upward).

The stator 10 includes a stator core 12, a coil 14, a coil 16, insulators 18, insulators 20, insulators 22, and insulators 24. The stator core 12 includes a ring-shaped back yoke 26 (FIG. 2), a plurality of teeth 28 projecting radially inward from the back yoke 26. Each tooth 28 is formed with protrusions 28a protruding to both sides in the circumferential direction from the radially inner end of the tooth 28.

The stator core 12 is formed with a plurality of slots 30 formed to align in the circumferential direction. Note that, in FIGS. 1 and 2, a total of six slots 30a to 30f of the plurality of slots 30 are shown.

Each of the slots 30 is formed to open to radially inside. In particular, each of the slots 30 is defined by an inner wall surface 32 of the back yoke 26, a side wall surface 34 of one tooth 28 in one direction of the circumferential direction, a side wall surface 36 of another tooth 28, which is adjacent to the one tooth 28 in the one direction of the circumferential direction, in the other direction of the circumferential direction, and inner wall surfaces 28b of two opposing protrusion 28a.

Figure 2:
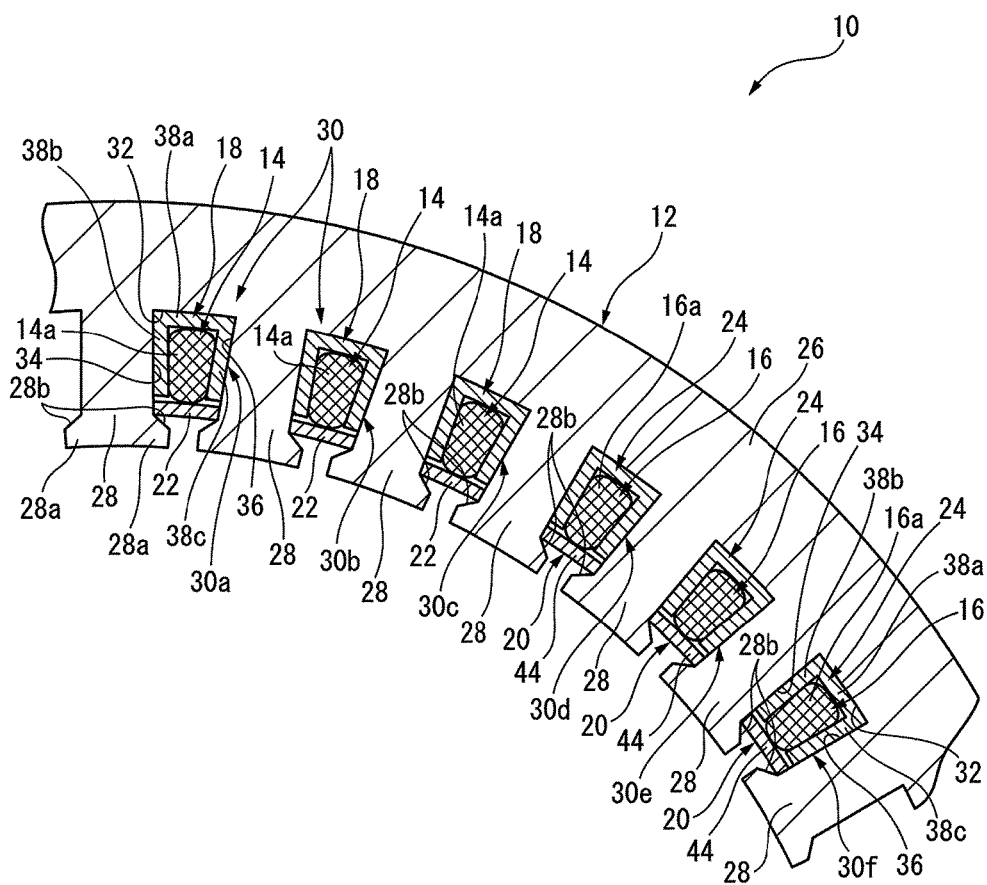
FIG. 2 is a view of the stator shown in FIG. 1, as seen from axially upside thereof.

The coil 14 and the coil 16 are wound around the stator core 12. In this embodiment, the coil 14 and the coil 16 are different transmission lines for transmitting alternating current signals of different phases of a three-phase alternating current (e.g., U and V lines, V and W lines, or U and W lines). In FIGS. 1 and 2, the coil 14 is wired so as to pass through the slots 30a, 30b, and 30c, respectively.

The coil 14 includes coil sides 14a respectively received in the slots 30a, 30b, and 30c, and coil ends 14b connected to the coil sides 14a and extending outward from the slots 30a, 30b, and 30c at both axial sides of the stator core 12. Note that, in FIG. 1, only the coil ends 14b extending axially upward from the slots 30a, 30b, and 30c are shown.

The coil 16 is wired so as to pass through the slots 30d, 30e, and 30f, respectively. The coil 16 includes coil sides 16a respectively received in the slots 30d, 30e, and 30f, and coil ends 16b connected to the coil sides 16a and extending outward from the slots 30d, 30e, and 30f at both axial sides of the stator core 12.

In FIG. 1, only the coil ends 16b extending axially upward from the slots 30d, 30e, and 30f are shown. In this embodiment, the coil ends 14b of the coil 14 are wired so as to be arranged radially inside of the coil ends 16b of the coil 16.

Each of the insulators 18 is arranged in each of the slots 30a, 30b, and 30c. Each insulator 18 is a seamless one-piece member. Here, a "seamless one-piece member" means a single monolithic member which is not produced by coupling a plurality of strips by e.g. adhesion. The insulator 18 is made of e.g. a paper or resin material.

Figure 3:
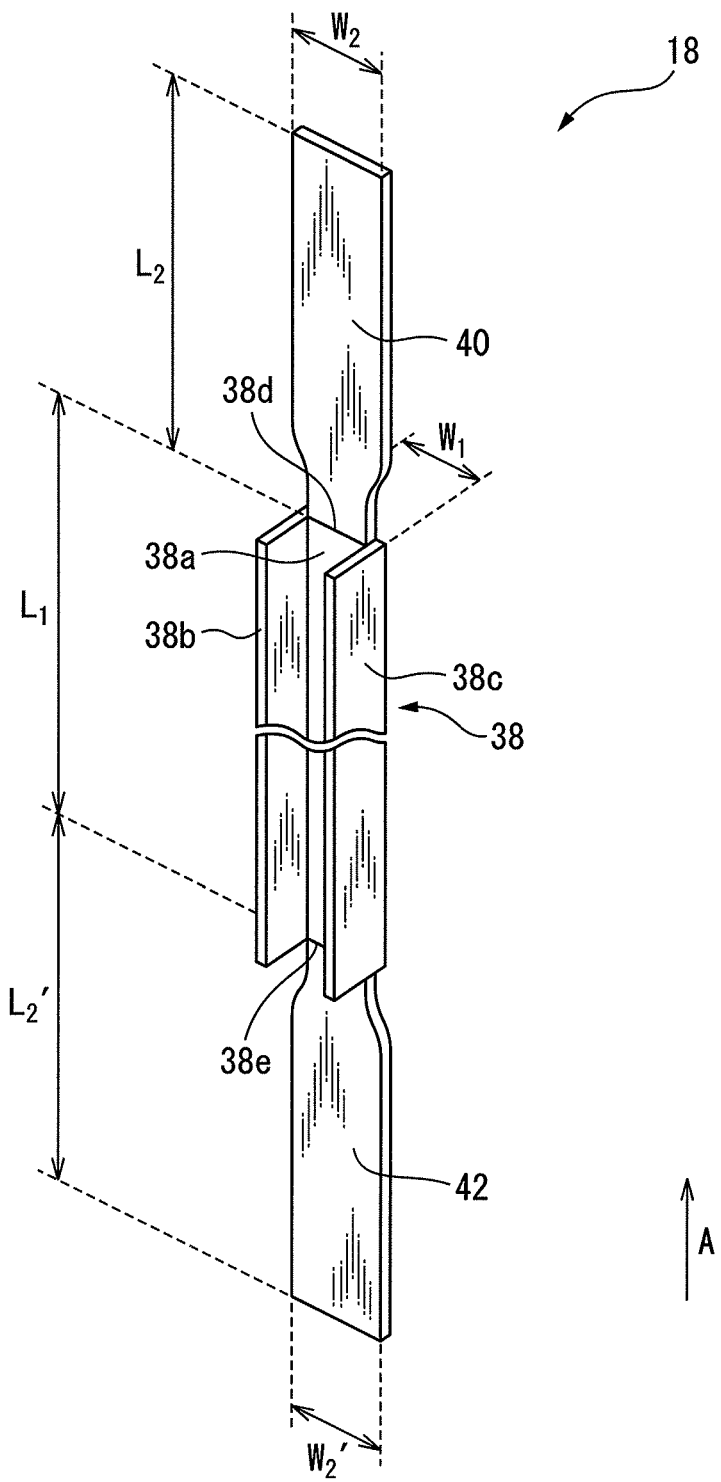
FIG. 3 is a perspective view of the insulator shown in FIG. 1.

As shown in FIG. 3, the insulator 18 includes a coil side-insulation part 38, a coil end-insulation part 40, and a coil end-insulation part 42. The coil side-insulation part 38 has a substantially U-shaped cross-section, and includes a bottom 38a and sides 38b and 38c extending from both ends of the bottom 38a in the circumferential direction so as to oppose to each other.

The coil side-insulation part 38 has a circumferential direction width $W_1$ and an axial direction length $L_1$. In this embodiment, the circumferential direction width $W_1$ is set to be equal to or smaller than the circumferential direction width of the slots 30a, 30b, and 30c. The axial direction length $L_1$ is set to be equal to or greater than the axial direction length of the slots 30a, 30b, and 30c.

The coil end-insulation part 40 is integrally coupled with an axially upper end 38d of the coil side-insulation part 38, and extends axially upward from the coil side-insulation part 38. The coil end-insulation part 42 is integrally coupled with an axially lower end 38e of the coil side-insulation part, and extends axially downward from the coil side-insulation part 38.

The coil end-insulation parts 40 and 42 respectively have circumferential direction widths $W_2$ and $W_2'$, and axial direction lengths $L_2$ and $L_2'$. The circumferential direction widths $W_2$ and $W_2'$ may be the same or different. Similarly, the axial direction lengths $L_2$ and $L_2'$ may be the same or different.

In this embodiment, circumferential direction widths $W_2$ and $W_2'$ are set to be greater than the circumferential direction width of the slots 30a, 30b, and 30c. As described below, the axial direction lengths $L_2$ and $L_2'$ are set to be long enough to insulate the coil ends 14b from the coil ends 16b.

As shown in FIG. 2, when the insulators 18 are respectively arranged in the slots 30a, 30b, and 30c, the bottom 38a of the coil side-insulation part 38 of one insulator 18 is arranged between the coil side 14a of the coil 14 and the inner wall surface 32 which defines the slot 30a, 30b or 30c, and electrically insulates the coil side 14a from the inner wall surface 32.

Further, the side 38b of the coil side-insulation part 38 is arranged between the coil side 14a and the side wall surface 34 which defines the slot 30a, 30b or 30c, and insulates the coil side 14a from the side wall surface 34.

Further, the side 38c of the coil side-insulation part 38 is arranged between the coil side 14a and the side wall surface 36 which defines the slot 30a, 30b or 30c, and insulates the coil side 14a from the side wall surface 36.

In this way, the coil side 14a received in the slot 30a, 30b or 30c is surrounded by the bottom 38a and sides 38b and 38c of the coil side-insulation part 38 from both sides in the circumferential and from radially outside, so as to be insulated from the wall surfaces 32, 34 and 36 which define the slot 30a, 30b or 30c.

On the other hand, as shown in FIG. 1, the coil end-insulation part 40 of one insulator 18 extends axially upward from the stator core 12 to the outside of the slot 30a, 30b or 30c. The coil end-insulation part 40 is arranged between the coil end 14b of the coil 14 and the coil end 16b of the coil 16 wired axially upward of the slot 30a, 30b or 30c, and electrically insulates the coil end 14b from the coil end 16b.

Accordingly, the axial direction length $L_2$ of each coil end-insulation part 40 is set to be long enough to electrically insulate the coil end 14b from the coil end 16b. For example, the axial direction length $L_2$ is set so that the axially upper end of each coil end-insulation part 40 can be positioned axially upward of the axially upper ends of the coil ends 14b and 16b.

Further, as shown in FIG. 1, the coil end-insulation parts 40 of two insulators 18 adjacent to each other in the circumferential direction are arranged so as to overlap each other in the radial direction. Accordingly, the circumferential direction width $W_2$ of the coil end-insulation parts 40 is set to be wide enough to allow the two coil end-insulation parts 40 adjacent to each other in the circumferential direction to overlap each other, in the state shown in FIG. 1.

Similarly to the coil end-insulation parts 40, the coil end-insulation part 42 of one insulator 18 extends axially downward from the stator core 12 to the outside of the slot 30a, 30b or 30c. The coil end-insulation part 42 is arranged between the coil end 14b of the coil 14 and the coil end 16b of the coil 16 at axially downside of the stator core 12, and electrically insulates the coil end 14b from the coil end 16b.

Each of the insulators 20 is arranged in each of the slots 30d, 30e, and 30f. Similarly to the insulator 18, each insulator 20 is a seamless one-piece member. The insulator 20 is made of e.g. a paper or resin material.

Figure 4:
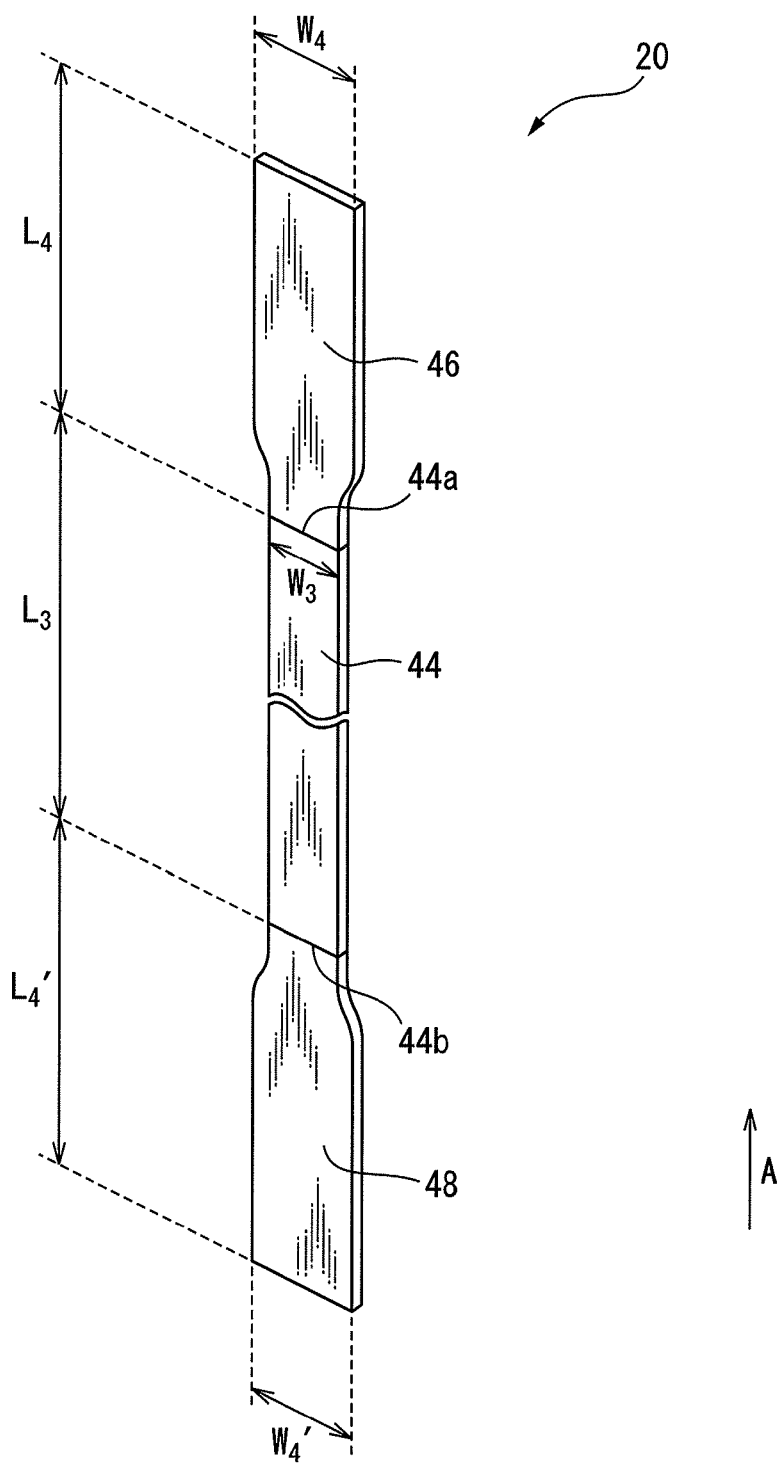
FIG. 4 is a perspective view of another insulator shown in FIG. 1.

As shown in FIG. 4, the insulator 20 includes a coil side-insulation part 44, a coil end-insulation part 46, and a coil end-insulation part 48. The coil side-insulation part 44 has a shape similar as the above-mentioned bottom 38a. In particular, the coil side-insulation part 44 has a circumferential direction width $W_3$ and an axial direction length $L_3$.

In this embodiment, the circumferential direction width $W_3$ is set to be equal to or smaller than the circumferential direction width of the slots 30d, 30e, and 30f. The axial direction length $L_3$ is set to be equal to or greater than the axial direction length of the slots 30d, 30e, and 30f.

The coil end-insulation part 46 is integrally coupled with an axially upper end 44a of the coil side-insulation part 44, and extends axially upward from the coil side-insulation part 44. The coil end-insulation part 48 is integrally coupled with an axially lower end 44b of the coil side-insulation part 44, and extends axially downward from the coil side-insulation part 44.

The coil end-insulation parts 46 and 48 respectively have circumferential direction widths $W_4$ and $W_4'$, and axial direction lengths $L_4$ and $L_4'$. The circumferential direction widths $W_4$ and $W_4'$ may be the same or different. Similarly, the axial direction lengths $L_4$ and $L_4'$ may be the same or different.

In this embodiment, the circumferential direction widths $W_4$ and $W_4'$ are set so as to be greater than the circumferential direction width of the slots 30d, 30e, and 30f. As described below, the axial direction lengths $L_4$ and $L_4'$ are set to be long enough to insulate the coil ends 14b from the coil ends 16b.

As shown in FIG. 2, when the insulators 20 are respectively arranged in the slots 30d, 30e, and 30f, the coil side-insulation part 44 of one insulator 20 is arranged between the coil side 16a of the coil 16 and the inner wall surfaces 28b of two opposing protrusions 28a, and electrically insulates the coil side 16a from the inner wall surfaces 28b.

Along with this, the coil side-insulation part 44 seals the radially inside opening of the slot 30d, 30e or 30f. Due to this, the coil side-insulation part 44 prevents the coil side 16a from dropping off from the slot 30d, 30e or 30f.

On the other hand, as shown in FIG. 1, the coil end-insulation part 46 of one insulator 20 extends axially upward from the stator core 12 to the outside of the slots 30d, 30e or 30f. The coil end-insulation part 46 is arranged between the coil end 16b of the coil 16 and the coil end 14b of the coil 14 wired axially upward of the slot 30d, 30e or 30f, and electrically insulates the coil end 16b from the coil end 14b.

Accordingly, the axial direction length $L_4$ of each coil end-insulation part 46 is set to be long enough to electrically insulate the coil ends 16b from the coil ends 14b. For example, the axial direction length $L_4$ is set so that the axially upper end of each coil end-insulation part 46 can be positioned axially upward of the axially upper ends of the coil ends 14b and 16b.

Further, as shown in FIG. 1, the coil end-insulation parts 46 of two insulators 20 adjacent to each other in the circumferential direction are arranged so as to overlap each other in the radial direction. Accordingly, the circumferential direction width $W_4$ is set to be wide enough to allow the two coil end-insulation parts 46 adjacent to each other in the circumferential direction to overlap each other, in the state shown in FIG. 1.

Similarly to the coil end-insulation parts 46, the coil end-insulation part 48 of one insulator 20 extends axially downward from the stator core 12 to the outside of the slot 30d, 30e or 30f. The coil end-insulation part 48 is arranged between the coil end 16b of the coil 16 and the coil end 14b of the coil 14 at axially downside of the stator core 12, and electrically insulates the coil end 16b from the coil end 14b.

As shown in FIGS. 1 and 2, each of the insulators 22 is arranged in each of the slots 30a, 30b and 30c. Each insulator 22 has a shape the same as the coil side-insulation part 44 of the insulator 20. Each insulator 22 is arranged between the coil side 14a of the coil 14 and the inner wall surfaces 28b defining the slot 30a, 30b or 30c, and electrically insulates the coil side 14a from the inner wall surfaces 28b.

Along with this, the insulator 22 seals the radially inside opening of the slot 30a, 30b or 30c. Due to this, the insulator 22 can prevent the coil side 14a from dropping off from the slot 30a, 30b or 30c.

Each of the insulators 24 is arranged in each of the slots 30d, 30e, and 30f. Each insulator 24 has a shape the same as the coil side-insulation part 38 of the insulator 18. In particular, the insulator 24 has a substantially U-shaped cross-section, and includes the bottom 38a and the sides 38b and 38c.

As shown in FIG. 2, the bottom 38a of one insulator 24 is arranged between the coil side 16a of the coil 16 and the inner wall surface 32 defining the slot 30d, 30e or 30f, and electrically insulates the coil side 16a from the inner wall surface 32.

Further, the side 38b of one insulator 24 is arranged between the coil side 16a of the coil 16 and the side wall surface 34 defining the slot 30d, 30e or 30f, and insulates the coil side 16a from the side wall surface 34.

Further, the side 38c of one insulator 24 is arranged between the coil side 16a of the coil 16 side and the wall surface 36 defining the slot 30d, 30e or 30f, and insulates the coil side 16a from the side wall surface 36.

In this embodiment, since the coil side-insulation parts 38 of the insulators 18 are received in the slots 30, the movement of each insulator 18 in the circumferential direction is restricted. In addition, the coil end-insulation parts 40 and 42 of the insulators 18 engage the axial end surfaces of the stator core 12, due to which, the movement of each insulator 18 in the axial direction is also restricted.

Similarly, since the coil side-insulation parts 44 of the insulators 20 are received in the slots 30, the movement of each insulator 20 in the circumferential direction is restricted. In addition, the coil end-insulation parts 46 and 48 of the insulators 20 engage the axial end surfaces of the stator core 12, due to which, the movement of each insulator 20 in the axial direction is also restricted.

According to this embodiment, the insulators 18 and 20 are securely held in the positions shown in FIG. 1, thereby it is possible to prevent the insulators 18 and 20 from being displaced from given positions.

Further, in this embodiment, the insulators 18 and 20 have simple shapes suitable for mass production, and can be easily fitted in the slots 30. Therefore, by mass-producing the insulators 18 and 20 in advance, it is possible to flexibly meet the demand of producing various kinds of motors having different numbers of slots, along with simplifying the production work. As a result, the production costs can be reduced.

Further, the insulators 18 and 20 can electrically insulate the coil sides 14a and 16a from the stator core 12, and also the coil ends 14b from the coil ends 16b.

Further, in this embodiment, the coil end-insulation parts 40, 46 circumferentially adjacent to each other are arranged so as to overlap each other. According to this configuration, a gap between the adjacent coil end-insulation parts 40, 46 can be prevented from being formed, thereby it is possible to reliably insulate the coil ends 14b from the coil ends 16b.

Figure 5:
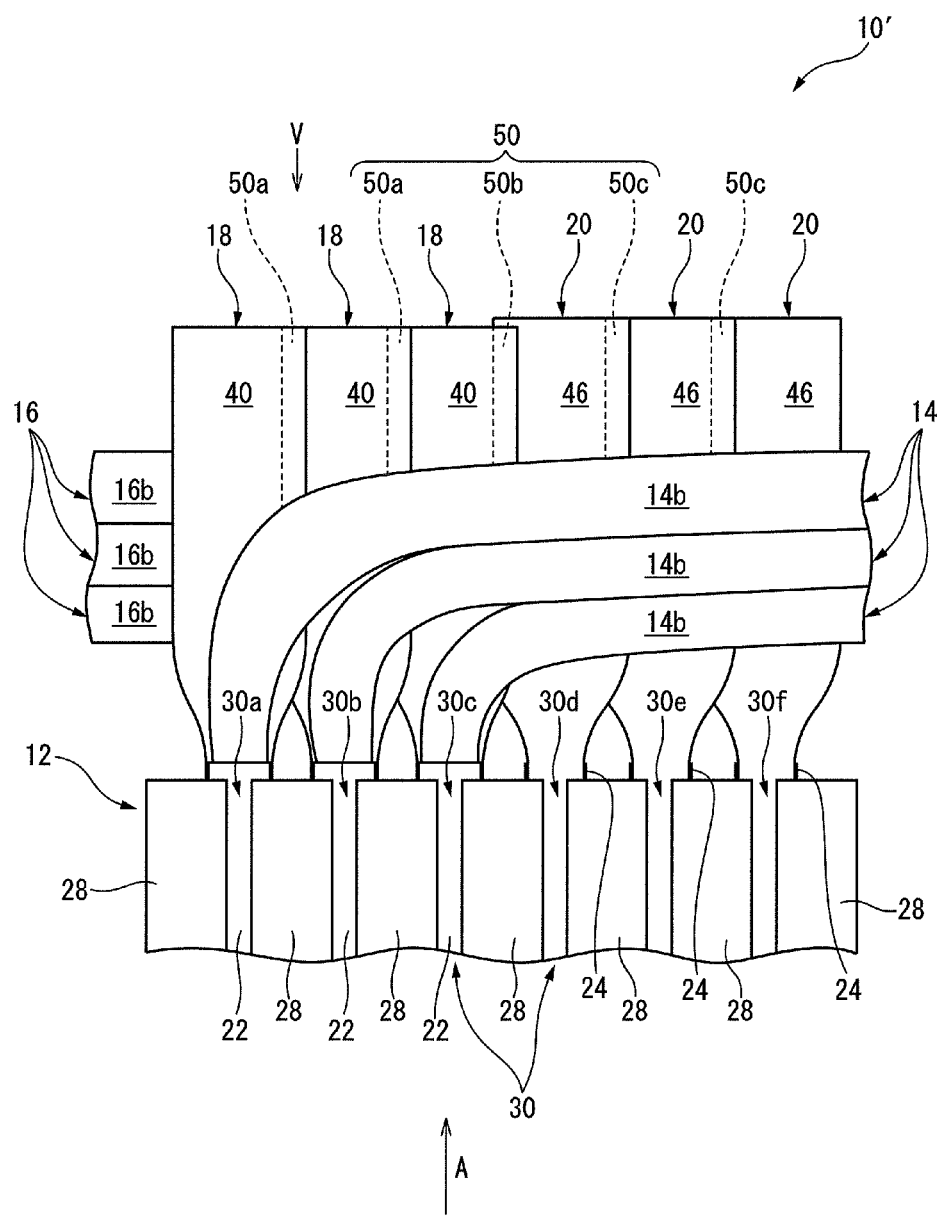
FIG. 5 is a view of a stator according to another embodiment, as seen from radially inside thereof.
Figure 6:
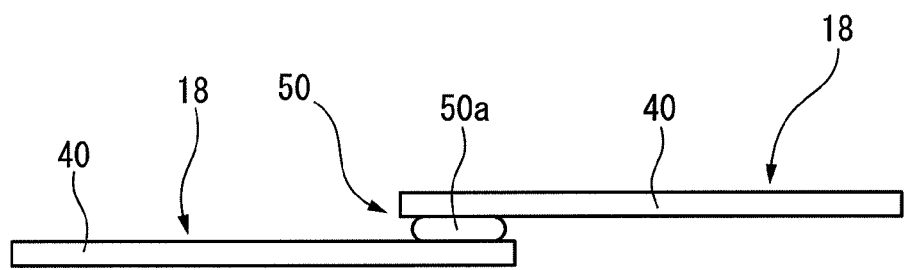
FIG. 6 is a view for explaining the connection part shown in FIG. 5, as seen from the direction indicated by the arrow V in FIG. 5.

Next, referring to FIGS. 5 and 6, a stator 10' according to another embodiment will be described. The stator 10' according to this embodiment differs from the above-mentioned stator 10 in that the stator 10' further includes a plurality of connection parts 50.

Each connection part 50 connects the coil end-insulation parts 40, 46 of two adjacent insulators 18, 20. In particular, the connection parts 50 include connection parts 50a, 50b, and 50c.

The connection part 50a connects the coil end-insulation parts 40 of two insulators 18 adjacent to each other. The connection part 50a is arranged between the radially overlapping parts of the two adjacent coil end-insulation parts 40.

The connection part 50b connects the coil end-insulation part 40 of the insulator 18 and the coil end-insulation part 46 of the insulator 20 adjacent to that insulator 18. The connection part 50b is arranged between the radially overlapping parts of the adjacent coil end-insulation parts 40 and 46.

The connection part 50c connects the coil end-insulation parts 46 of two insulators 20 adjacent to each other. The connection part 50c is arranged between the radially overlapping parts of the two adjacent coil end-insulation parts 46.

The connection part 50 is e.g. adhesive agents or adhesive tapes. Alternatively, the connection part 50 may be constituted by an engaging part provided at one of two adjacent coil end-insulation parts 40, 46 and a receiving part provided at the other so as to engage the engaging part, such as MAGIC TAPE (registered trademark), i.e., a hook and loop fastener.

According to this embodiment, since the coil end-insulation parts 40, 46 can be connected to each other in the circumferential direction by connection parts 50, the insulators 18 and 20 can be more-securely held in given positions. Therefore, it is possible to effectively prevent the insulators 18 and 20 from being displaced from the given positions.

In the above-described embodiment, the stator 10 is a cylindrical stator which constitutes a rotary motor. However, the idea of the invention is not limited to this embodiment, but can be applied to a linear stator which constitutes a linear motor.

In this case, the stator includes a back yoke linearly extending in a first direction, and a plurality of teeth extending from the back yoke in a second direction perpendicular to the first direction and arranged to align in the first direction, wherein the above-mentioned insulators 18 and 20 are respectively arranged in the slots formed between two adjacent, in a similar manner as shown in FIGS. 1 and 2.

The invention has so far been described with embodiments of the invention but the above-described embodiments are not intended to limit the scope of the invention defined by the attached claims. Further, combinations of the features described in relation to the embodiments of the invention may also be covered by the technical scope of the invention, but it does not mean that all combination of these features are necessary for solution means provide by the invention. Still further, it is obvious to those skilled in the art that various modifications or improvements can be made to the above-described embodiments.

The invention claimed is:

1. A stator of an electric motor, the stator comprising:
a stator core formed with a plurality of slots, each slot being defined by an inner wall surface and a pair of side wall surfaces extending radially inward from the inner wall surface so as to be opposite to each other;
a first coil wound around the stator core, and configured to transmit a signal of a first phase, the first coil including a first coil side received in a first slot of the plurality of slots and a first coil end arranged outside of the first slot, only the first coil being received in the first slot;
a second coil wound around the stator core and configured to transmit a signal of a second phase different from the first phase, the second coil including a second coil side received in a second slot of the plurality of slots and a second coil end arranged outside of the second slot, only the second coil being received in the second slot; and
at least one first insulator arranged in the first slot, the first insulator including:

a first coil side-insulation part having a bottom arranged between the inner wall surface of the first slot and the first coil side so as to contact the inner wall surface of the first slot, the bottom of the first coil side-insulation part electrically insulating the first coil side from the inner wall surface of the first slot; and
a first coil end-insulation part integrally coupled with the bottom of the first coil side-insulation part, and arranged outside of the first slot, the first coil end-insulation part being arranged between the first coil end and the second coil end, the first coil end-insulation part electrically insulating the first coil end from the second coil end.

2. The stator according to claim 1, further comprising at least one second insulator arranged in the second slot, the second insulator including:
a second coil side-insulation part arranged radially inside of the second coil side so as to seal an opening of the second slot; and
a second coil end-insulation part integrally coupled with the second coil side-insulation part, and arranged outside of the second slot, the second coil end-insulation part being arranged between the first coil end and the second coil end, the second coil end-insulation part electrically insulating the first coil end from the second coil end.

3. The stator according to claim 2, wherein the first coil end-insulation part and the second coil-end insulation part adjacent to each other in the circumferential direction are arranged so as to overlap each other in the radial direction.

4. The stator according to claim 3, further comprising a connection part arranged between the first coil end-insulation part and the second coil end-insulation part adjacent to each other, and configured to connect the first coil end-insulation part and the second coil end-insulation part to each other.

5. An electric motor comprising a stator according to claim 1.

6. The stator according to claim 2, wherein ends of the first and second coil end-insulation parts extend axially upwards from upper ends of the first and second coil ends.

7. The stator according to claim 2, wherein a circumferential direction width of the second coil end-insulation part is greater than that of the second coil side-insulation part.

* * * * *